US009604295B1

(12) United States Patent
Halsey

(10) Patent No.: US 9,604,295 B1
(45) Date of Patent: Mar. 28, 2017

(54) COPING SAW

(76) Inventor: Thomas J. Halsey, Milford, OH (US)

( * ) Notice: Subject to any disclaimer, the term of this patent is extended or adjusted under 35 U.S.C. 154(b) by 868 days.

(21) Appl. No.: 12/653,308

(22) Filed: Dec. 11, 2009

(51) Int. Cl.
*B27B 21/00* (2006.01)
*B23D 51/01* (2006.01)
*B23D 51/14* (2006.01)
*B27B 19/14* (2006.01)

(52) U.S. Cl.
CPC ............ *B23D 51/01* (2013.01); *B23D 51/14* (2013.01); *B27B 19/14* (2013.01)

(58) Field of Classification Search
CPC .......... B23D 51/01; B23D 51/14; B27B 19/14
USPC ........................... 30/509, 380, 514, 312, 392
See application file for complete search history.

(56) References Cited

U.S. PATENT DOCUMENTS

| | | | |
|---|---|---|---|
| 1,584,630 A | 5/1926 | Meighan | |
| 1,955,063 A | 4/1934 | Greitzer | |
| 2,487,277 A * | 11/1949 | Siftar | 125/14 |
| 2,604,910 A | 7/1952 | Crosby | |
| 2,690,774 A | 10/1954 | Hoard | |
| 3,621,894 A | 11/1971 | Niksich | |
| 4,413,414 A | 11/1983 | Strzalka | |
| 4,949,464 A | 8/1990 | Adomatis | |
| 5,363,558 A * | 11/1994 | Schroeder | 30/380 |
| 5,388,334 A | 2/1995 | Halsey | |
| 6,401,346 B1 * | 6/2002 | Roberts | 30/380 |
| 6,805,208 B2 * | 10/2004 | Kusmierski et al. | 173/170 |
| 6,973,728 B2 * | 12/2005 | Ellson et al. | 30/276 |
| 7,266,893 B1 * | 9/2007 | Ellson et al. | 30/276 |
| 7,275,322 B2 * | 10/2007 | Stones | 30/216 |
| 7,814,665 B2 * | 10/2010 | Stones | 30/199 |
| 2005/0126009 A1 * | 6/2005 | Stones | 30/100 |
| 2007/0101586 A1 * | 5/2007 | Felder et al. | 30/392 |
| 2009/0320301 A1 * | 12/2009 | Heinrichs et al. | 30/374 |
| 2011/0119934 A1 * | 5/2011 | Bertsch et al. | 30/380 |
| 2012/0023761 A1 * | 2/2012 | Martinsson et al. | 30/381 |
| 2012/0067185 A1 * | 3/2012 | Weusthof | 83/397 |

* cited by examiner

*Primary Examiner* — Omar Flores Sanchez
(74) *Attorney, Agent, or Firm* — Mark F. Smith; Smith Brandenburg Ltd

(57) ABSTRACT

The present invention is a new and improved coping saw for performing a coping operation. The saw is operable in a first orientation for performing a first cut and in a second orientation for performing a coping second cut and comprises a handle having one or more power switches for activating and deactivating the drive system in both the first orientation and in the second orientation.

6 Claims, 10 Drawing Sheets

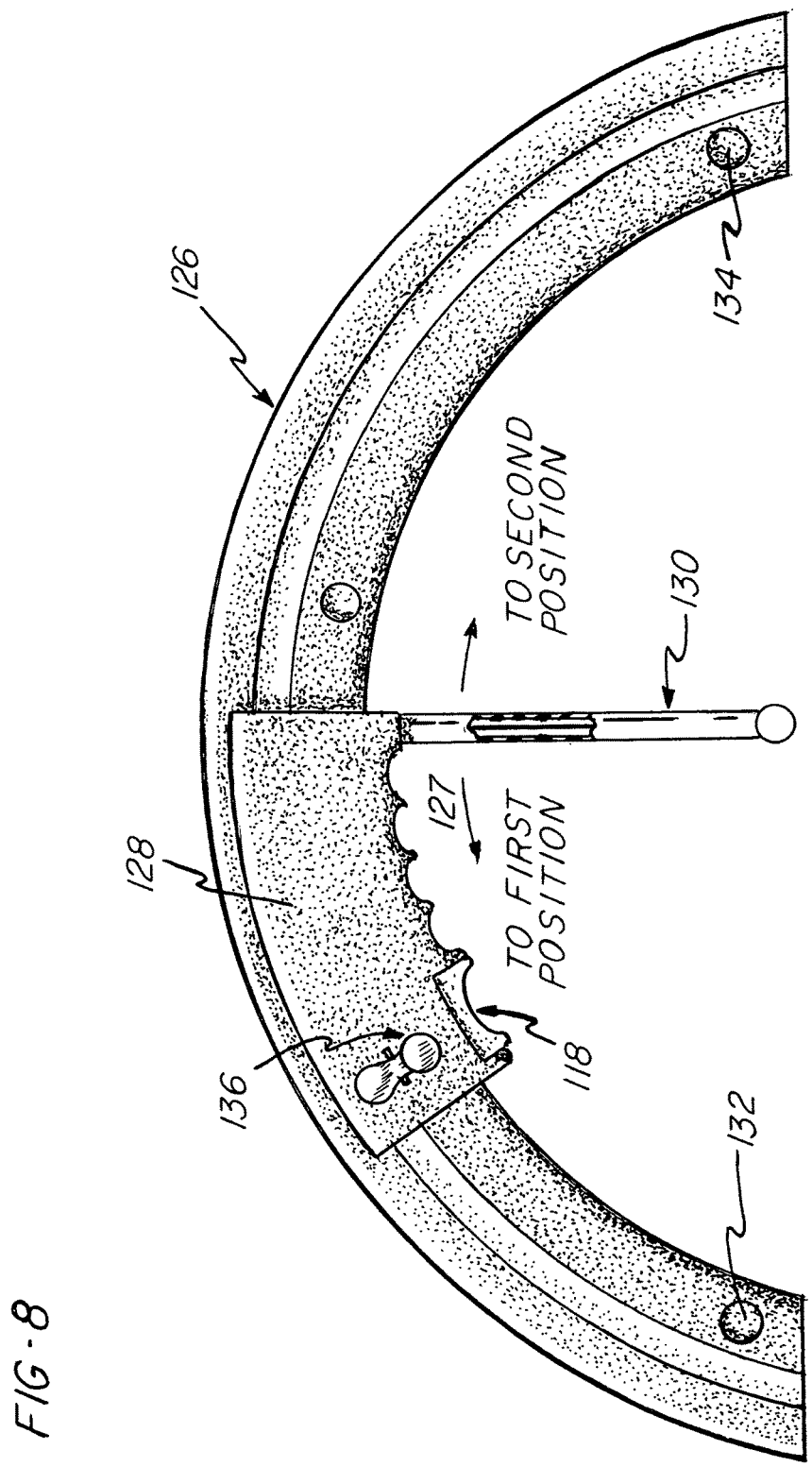

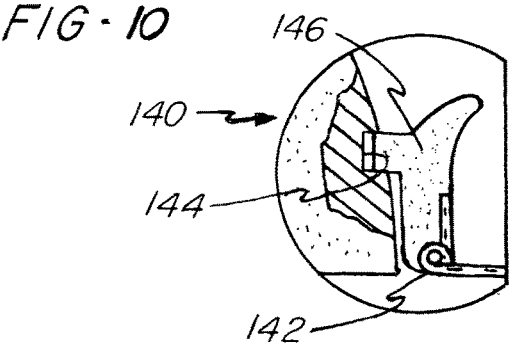
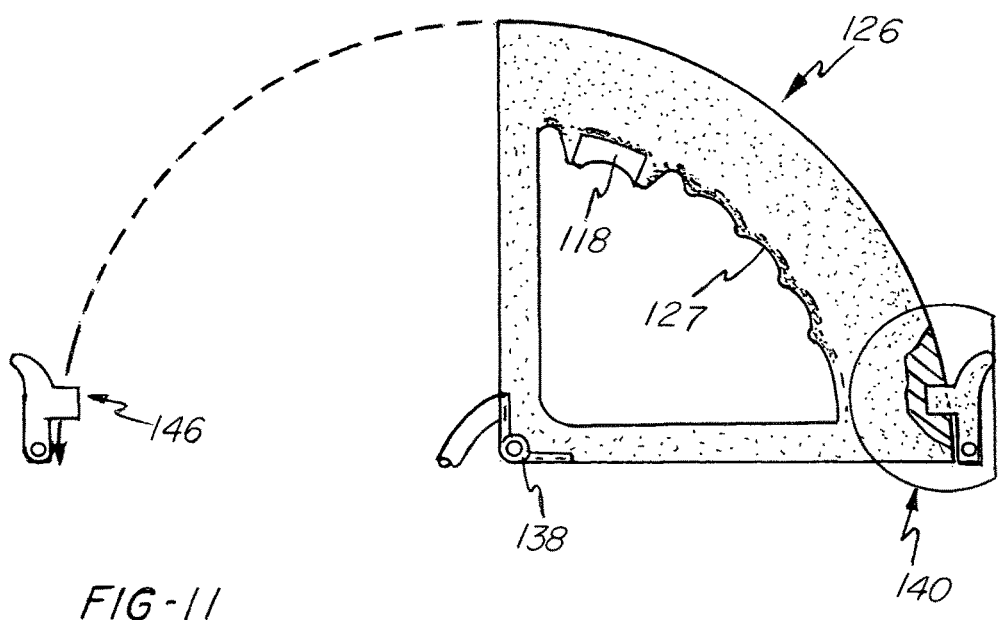
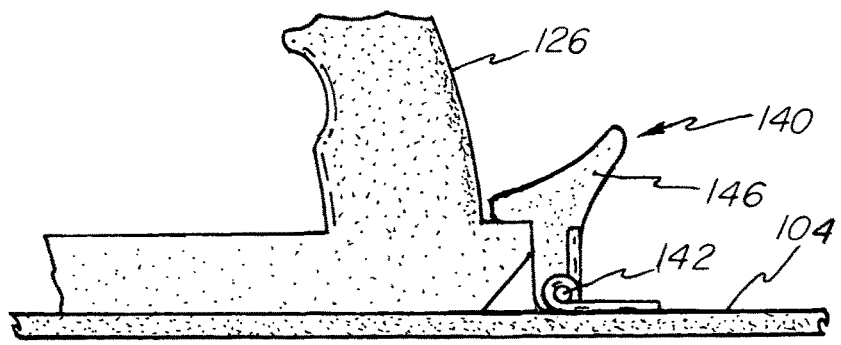

COPING SAW

BACKGROUND OF THE INVENTION

The subject invention is directed to a coping saw and more particularly to a coping saw having an improved handle that permits the coping saw to be easily operated in a first orientation for making a first cut and in a second orientation for making a coping second cut.

Traditionally, when a room is finished within a building, molding is often applied around the room adjacent the juncture between the ceiling and the walls and/or adjacent the juncture between the floor and the walls. The molding adjacent the ceiling is generally referred to as crown molding, while the molding adjacent the floor is generally referred to as baseboard molding. Molding is installed along a wall, and the different pieces of molding meet in the corners of the room to provide a seemingly endless border around the ceiling and floor of the room.

For aesthetic purposes it is desirable that the pieces of molding meet at each corner juncture without a seam so as to provide a seemingly continuous, unbroken boundary of molding. Making two pieces of molding match up without a seam is difficult because in most instances, molding has an ornate exposed surface which includes a variety of projections, curves and indentations. One proposed way of eliminating the seam is to miter or cut the molding pieces at a particular angle which will allow two pieces to meet at a corner juncture and form a continuous structure. For example, a corner piece of molding will be mitered at 45 degrees for a 90 degree room corner. However, it is very difficult to miter the molding so that there is an exact fit, and if the mitering is not exactly precise, a seam or crack appears and ruins the continuous look of the finished molding. Seamless mitering is even more difficult when the molding is tilted forward away from the wall, as crown molding often is.

Currently, the most popular technique for affixing separate pieces of molding together in the corner juncture of a room to provide an apparent and continuous and seamless structure is coping. Coping involves making a precise cut along one end of a piece of molding so that the cut end follows the unique projections, curves and indentations of the adjacent piece of corner molding. Proper coping of a piece of molding produces an almost perfect match at the corner juncture, and thereby yields an aesthetically pleasing continuous border structure around a room. Coping a piece of molding has traditionally required using a coping saw which is specially formed for the task of coping. A conventional coping saw is a hand saw with a very narrow blade that is held under tension in a shaped frame and is used for cutting curves in wood.

However, coping with such a traditional coping saw is a relatively slow, arduous, and labor intensive task. The manual sawing takes place with the blade generally at an angle. Furthermore, the saw blade must be guided around various curves, notches and protrusions. To cope, the operator saws back and forth being careful to maintain and follow the proper molding curves necessary to make the two corner pieces of molding match. Depending on the particular corner piece to be coped, the operator will either perform the coping process in a single step, such as for molding having a smooth and rounded contour, or in for more complicated shaped molding, as for molding having sharper angles and curved contours such as shown in FIG. 1, a two step process is used.

While it takes only seconds to miter a piece of molding with available miter boxes, depending upon the size of the molding, for molding requiring a coping cut it takes approximately one minute to as long as ten minutes to cope the molding piece with a traditional coping saw. To further frustrate the coping process, homeowners are requesting the use of more and more hardwoods for their molding, thus making coping an even more difficult, physical and time-consuming job. As may be appreciated, the increased time spent coping a piece of wood decreases the production of the woodworker not only by making the molding installation process time longer, but also by physically tiring the woodworker such that his work is slowed down by simple exhaustion.

There have been attempts in the prior art to ease the task and speed up the time necessary for coping a piece of molding. For example, U.S. Pat. No. 4,949,464 to Adomatis discloses an electrically operating coping saw. Such coping saws typically utilize a motor to drive a blade which reciprocates back and forth in a sawing motion. However, while such a design might seemingly reduce the continuous physical sawing motion normally required to cut with a coping saw, such coping saws are not very useful from a practical standpoint. Coping is a very precise and tedious operation often requiring small, precise cuts around the various curves and protrusions of a piece of molding. Such saws having reciprocating back and forth sawing motion have a tendency to shake and jerk as they cut. This shaking tends to make precision cutting difficult and throws the blade out of line with the precise curves, which must be followed to accurately cope a piece of molding. Furthermore, such saws are often difficult to even start on a piece of molding because of the shaking and jerking motion of the moving blade. As may be appreciated, starting the path of a coping saw into the correct curve line is a critical part of proper coping.

Other hand-held or portable powered sawing mechanisms are also known. For example, U.S. Pat. No. 1,955,063 to Greitzer discloses such a portable power saw. However, such saws are generally designed to accomplish very gross, straight cuts such as ripsaw work, crosscut work, metal cutting and the severing of bones in meat cutting. Because of the rigorous cutting action of such saws, the blade cannot be guided gently and precisely over a piece of molding as required for performing a coping cut.

The structures and frames of the other various prior art saws are also designed to make straight cuts on large pieces of wood as opposed to the delicate curved cuts involved with coping. For example, the saw disclosed in U.S. Pat. No. 3,621,894 to Niksich has a rigorous cutting action and requires two hands to operate and does not leave a hand free to hold and guide a piece of molding. Similarly, the saws disclosed in U.S. Pat. No. 1,584,630 to Meighan; U.S. Pat. No. 2,604,910 to Crosby; U.S. Pat. No. 2,690,774 to Hoard; and U.S. Pat. No. 4,413,414 to Strzalka all require two hands to properly operate and manipulate the saw. When making straight cuts in large bulk pieces of wood for which these saws are designed, the pieces of wood are often held by a clamp or are propped up between two sawhorses and thus do not require the operator to hold the wood while sawing. However, such saws require the operator to clamp the molding and making very precise cuts around the various curves of the molding to cope the piece is difficult.

Other saws have been developed for coping and include a continuous blade that travels around a pair of pulleys. While such coping saws allow more precise cuts they are difficult to operate in more than one orientation. Thus, for many coping operations requiring the user to operate the saw in more than one orientation, the saw is difficult to use and often results in cutting errors.

Consequently, there is a need for a coping saw which does not require the slow and tiresome physical sawing procedure of a traditional manual coping saw. There is further a need for a coping saw which can quickly and easily make precise cuts around any curves, notches and protrusions which are found on a piece of molding, and which is easy to start in a first operating orientation to properly make a first cut in a piece of molding and thereafter operate in a second operating orientation to easily and precisely manipulated around the various molding curves to perform a second coping cut.

SUMMARY OF THE INVENTION

The present invention is a new and improved coping saw for performing a coping operation on molding, wherein the coping saw operates in a first orientation for producing a first cut on the molding and in a second orientation for producing a coping second cut on the molding. Preferably, the coping saw comprises a housing, a drive system mounted to the housing for driving a continuous blade, and a handle having a first power switch and a second power switch for activating and deactivating the drive system in the first orientation and in the second orientation, respectively.

In another preferred embodiment of the invention the drive system comprises a drive wheel driven by an electric motor and coupled to a free wheel by the continuous blade.

In another preferred embodiment of the invention the coping saw further comprises a guide for providing a support surface for the molding during the cutting process.

In another preferred embodiment of the invention the coping saw operates in a first orientation for producing a first cut on the molding and in a second orientation for producing a coping second cut on the molding. Preferably, the coping saw comprises a housing, a drive system mounted to the housing for driving a continuous blade, and a handle having a centrally placed power switch for activating and deactivating the drive system in the first orientation and in the second orientation of the coping saw.

In another preferred embodiment of the invention the coping saw operates in a first orientation for producing a first cut on the molding and in a second orientation for producing a coping second cut on the molding. Preferably, the coping saw comprises a housing, a drive system mounted to the housing for driving a continuous blade, and a handle having a slidable power switch that operates to slide into a first position for operating the saw in its first orientation and to slide into a second position for operating the saw in its second orientation.

In another preferred embodiment of the invention the coping saw operates in a first orientation for producing a first cut on the molding and in a second orientation for producing a coping second cut on the molding. Preferably, the coping saw comprises a housing, a drive system mounted to the housing for driving a continuous blade, and a handle pivotally attached to the housing wherein the handle rotates into a first position for use of the saw in its first orientation and rotates into a second position for use of the saw in its second orientation.

In another preferred embodiment of the invention the saw further comprises a first and a second locking means for releasably securing the handle in position.

These and other benefits, advantages, and embodiments of the invention will be apparent from the following description, the accompanying drawings and the appended claims.

BRIEF DESCRIPTION OF THE DRAWINGS

Specific features, aspects, and advantages of the present invention will become better understood with regard to the following description, appended claims, and accompanying drawings where:

FIG. 8 is a partial side view of the saw handle of FIG. 7 showing a preferred embodiment of the electrical wiring system and means for securing the power switch in first position and in a second position;

FIG. 9 is a partial side view of another preferred embodiment of the saw handle having a power switch and a hinge assembly for allowing the saw handle to rotate into a first position for operating the saw in a first orientation and to rotate into a second position for operating the saw in a second orientation;

FIG. 10 is a detailed side view of the locking mechanism of the saw handle of FIG. 9 for securing the handle in position;

FIG. 11 is a detailed side view of another preferred embodiment of the locking mechanism of the saw handle of FIG. 9;

DETAILED DESCRIPTION OF THE INVENTION

The present invention solves the problems of the prior art saws discussed above and provides a distinct advance in the state of the art. The coping saw of the subject invention comprises an endless blade effective for cutting the profiled edge of a molding piece. The saw includes a saw handle effective for allowing the coping saw to be easily used in a first orientation for making a first cut and easily used in a second orientation for making a coping second cut along the profiled edge of a molding piece. As shown, when operating in the first orientation (FIG. 3) the user's hand on the handle is positioned above the housing and when operating in the second orientation (FIG. 4) the user's hand on the handle is positioned below the housing. As used herein, the phrase "the handle is positioned above the housing" means the housing is closer to the ground than the handle and the phrase "the handle is positioned below the housing" means the handle is closer to the ground.

Figure 1:
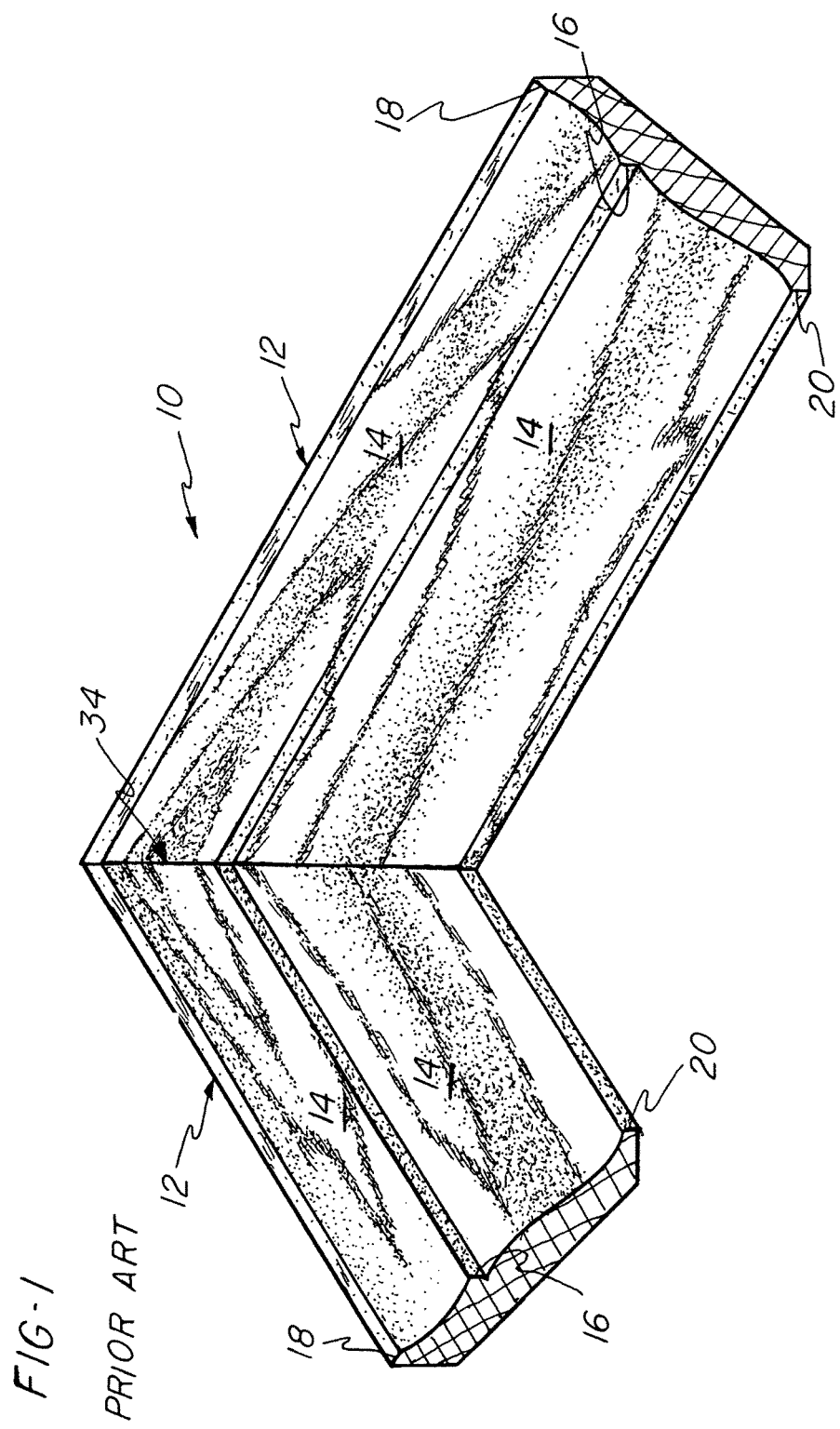
FIG. 1 is a perspective view of typical wall molding comprising a first molding piece and a second piece of molding.

Referring to FIG. 1, typical molding 10 formed from a plurality of molding pieces 12 is shown comprising several curved portions 14 having a relatively planar portion 16 there between and upper and lower straight end portions 18 and 20, respectively. It should be understood that molding 10 is not limited to the particular geographic shape shown but can have a combination of various curves, indentations, and protrusions to provide the desired appearance of the wood border formed by the molding 10.

Figure 2:
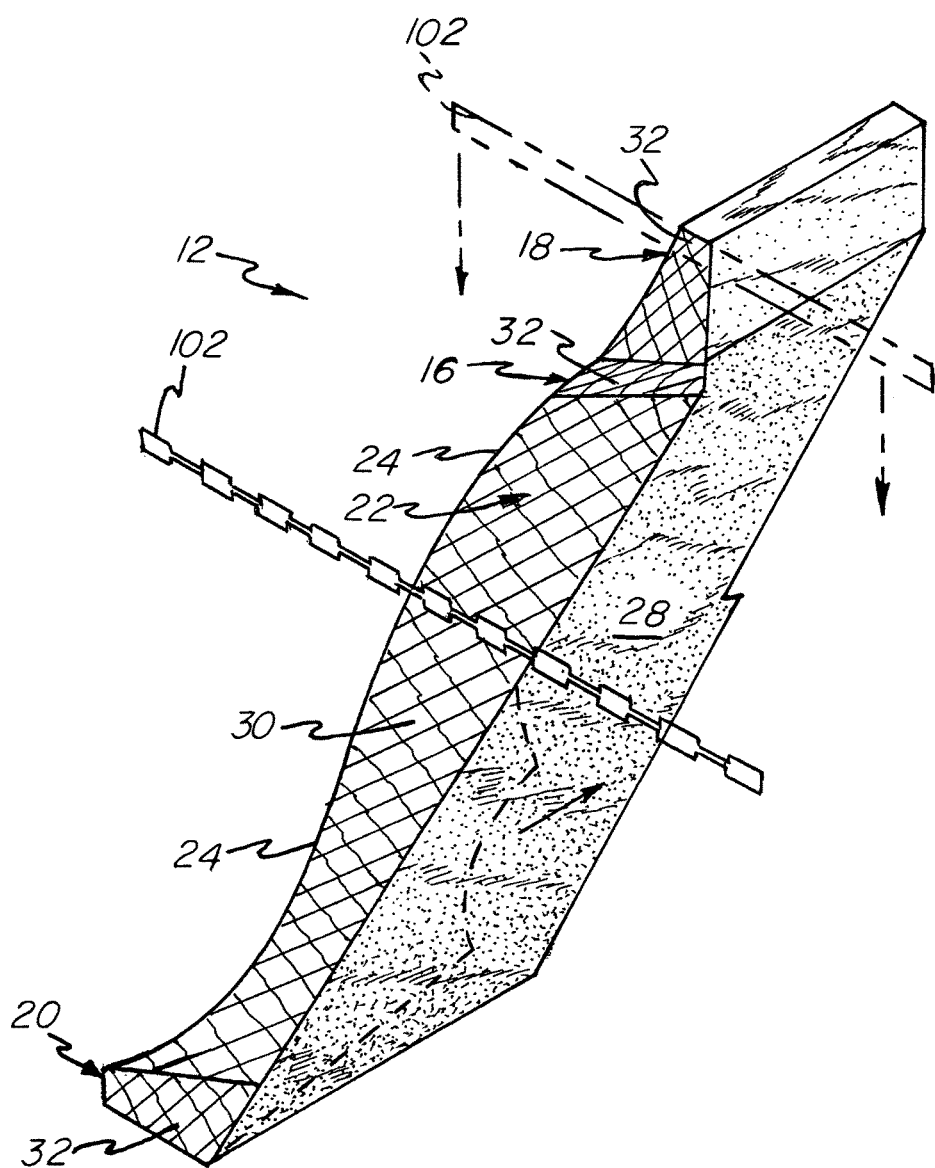
FIG. 2 is an schematic illustration of a molding piece forming the molding of FIG. 1 showing generally how a piece of the wall molding is coped at its end to achieve proper fit between the two molding pieces such as in the corner of a room.

Generally, before a piece 12 of molding 10 is coped, the two pieces of molding which are to be matched up in the corner are mitered. Ceiling molding often extends away from the wall at an angle. Mitering the two pieces achieves angled ends to the molding pieces which allow two pieces to fit together at a corner while assuming the chosen angle, such as 45 degrees, away from the wall. That is, as shown in FIG. 2, the molding pieces 12 are cut to define an angle at their ends to define angled end faces 22. Then, the angled end face 22 of the molding piece 12 must be coped on one of the matching pieces so that a portion of the uncoped molding piece fits behind the curved profile edge 24 of the coped molding piece 12.

In making the coped piece 12, some of the molding material, such as wood, must be removed from piece 12 behind the ornate front face 26, having curved portions 14 (FIG. 1) and adjacent curved profile edge 24 which must be followed during coping. In this particular example, straight cuts are first made along planar portion 16 and upper and lower end portions 18 and 20, respectively. A coping cut is then made along curved profile edge 24 with the blade 102 of the coping saw 100 angled behind profile edge 24 and into rearward face 28. The cut removes the molding board material to completely remove angled end face 22 and part of the rearward face 28 of molding 10. The cut thereby defines coped face 30. Typically in coping a curved molding such as described above, the first cut made along the planar portion 16 and upper and lower end portions 18 and 20 are generally perpendicular to the planar portion 16 and the upper and lower straight end portions 18 and 20. The second coping, is then made to remove ridges 32 on piece 12, such that the coped face 30 does not interfere with the curves of the non-coped molding piece (not shown) when the pieces are installed in the corner of a room. Therefore, the coped face 30 from the coping cut allows the two corner pieces 12 of molding 10 to fit together snugly in a tight and continuous juncture 34 (FIG. 1). FIG. 2 shows only part of the board actually coped, however, it may be appreciated that when the coping procedure is done, blade 102 will have made a cut along the entire length of profile edge 24 to define a fully coped face 30 on piece 12.

Figure 3:
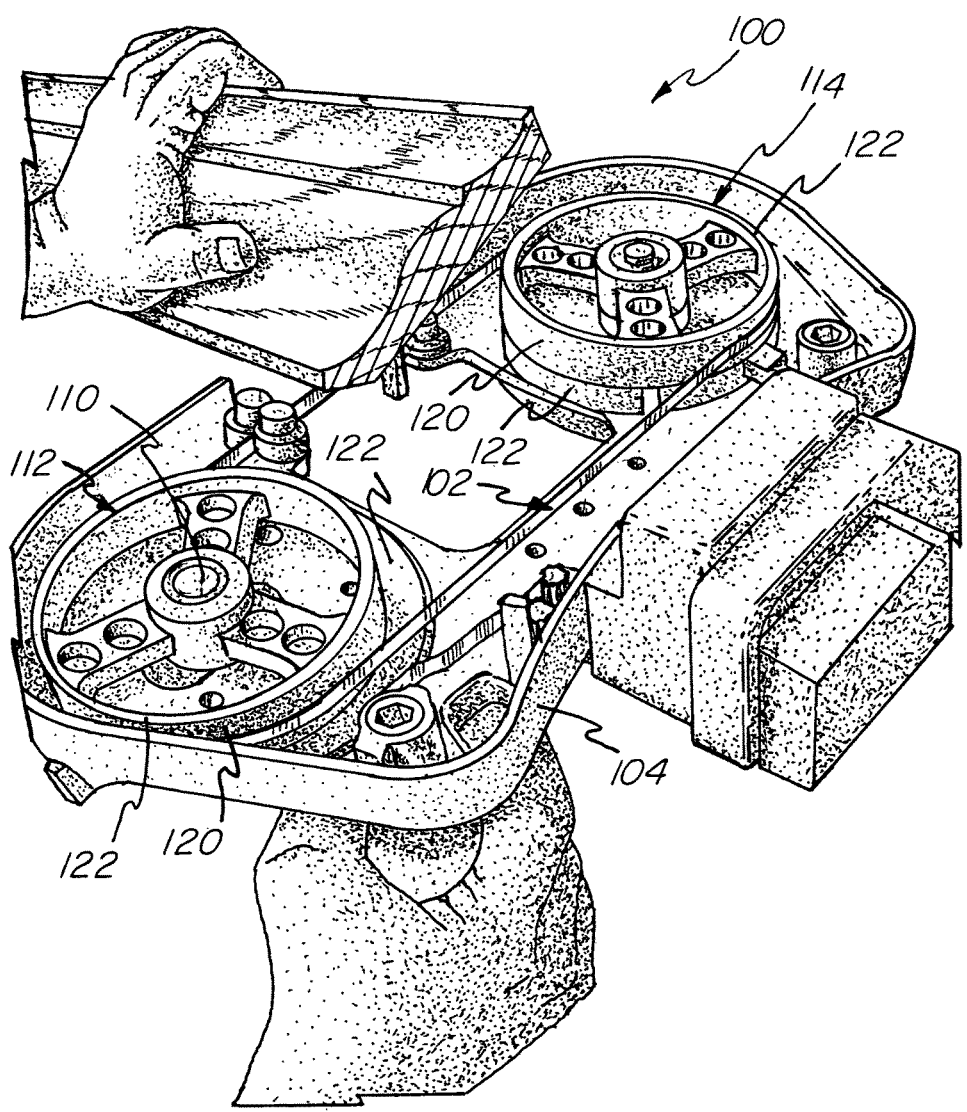
FIG. 3 is a perspective view of the coping saw of the subject invention illustrating the coping saw in a first orientation for performing a first cut of the molding piece of FIG. 2.

It should be understood that each piece 12 of the molding 10 may have an ornate front face which may include a variety of different curves, indentations and protrusions to give the appearance of a carved wood border. The shape of the front face 34 defines the curved profile edge 24 which must be followed during the coping cut. For molding 10 having one or planar portions 16 or one or more straight end portions 18, 20, the saw operator begins by placing the coping saw in its first orientation and making one or more straight cuts such as shown in FIG. 3. After the appropriate straight cuts have been made, starting at the top of curved profile edge 24, the coping saw 100 is placed in a second orientation (FIG. 4) for making a coping second cut and is moved such that the blade 102 travels precisely along the curves of profile edge 24 to the bottom of the molding piece 10 to form coped face 30. The cut removes material from the piece 10 at the rearward face 28 of the piece which is behind front face 34 and adjacent profile edge 24.

Figure 4:
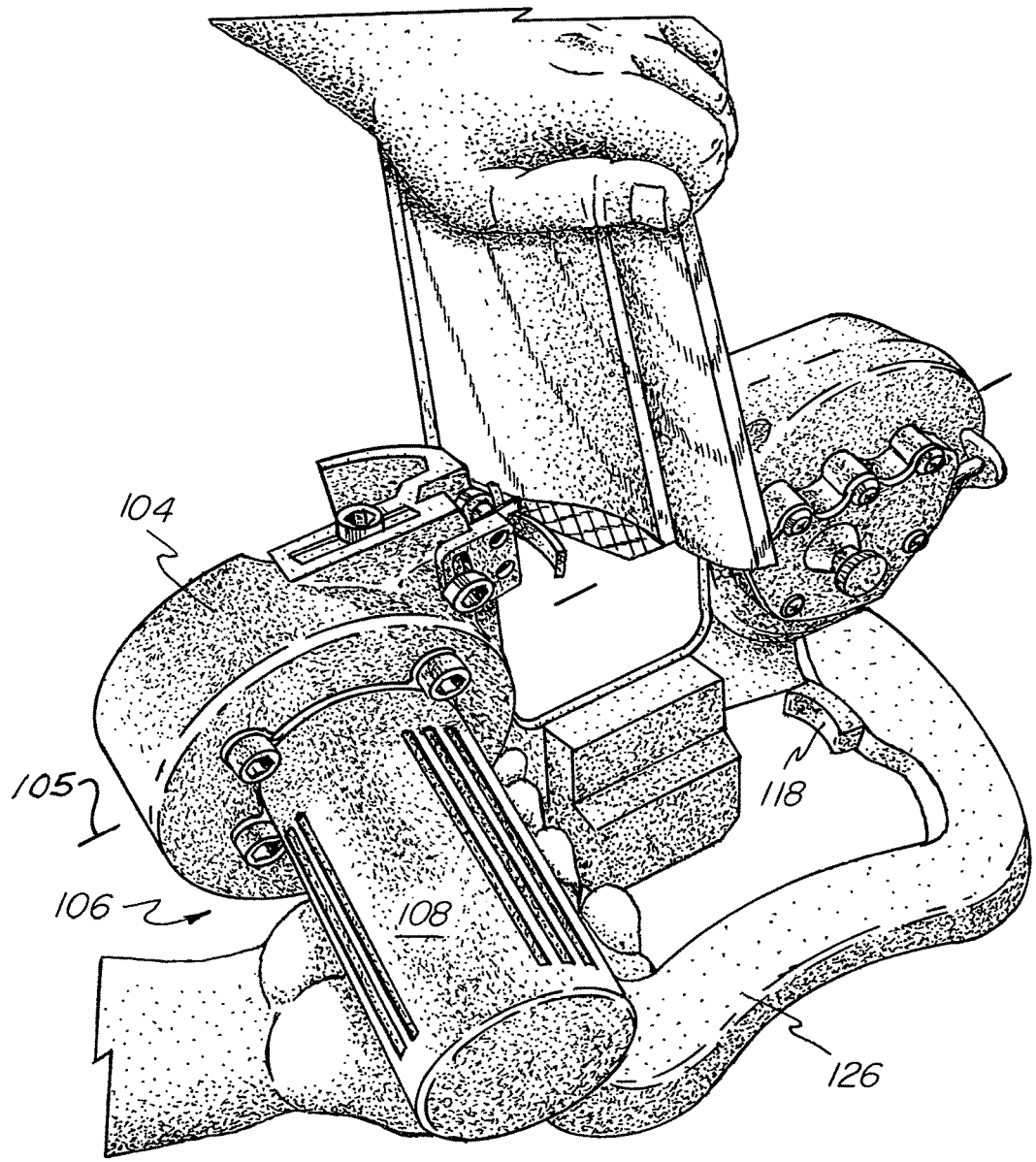
FIG. 4 is a perspective view of the coping saw of the subject invention illustrating the coping saw in a second orientation for performing a coping second cut of the molding piece of FIG. 2.

Referring to FIGS. 3 and 4, the coping saw 100 of the subject invention is shown comprising a housing 104, having a longitudinal axis 105, and a drive system 106 mounted to said housing and having a motor 108 which drives a rotating shaft 110 to rotate a drive wheel 112 coupled to the shaft 110. The motor 108 may be battery operated or driven by AC power. A free wheel 114 is coupled to the drive wheel 112 by a continuous blade 102. Rotation of the drive wheel 112 drives the blade 102 around the cavity 116 of the housing 104. It should be understood that other operating systems such as utilizing a direct coupling between the motor 108 and the drive wheel 112, may also be utilized to drive blade 102. One or more power switches 118 are electrically or mechanically coupled to the motor 108 and operate to turn the motor 108 on and off. In a preferred embodiment of the invention one or more of the power switches 118 can also operate as a variable speed control, such as by using the amount of pressure being applied to the power switch 118 by the operator to control the speed of the motor 100 and hence the speed of blade 102. It should also be understood that the speed control may be incorporated into the power switch 118 or may be provided as a separate control mechanism.

As the blade 102 is driven and moves around the drive wheel 112 and the free wheel 114 within the cavity 116, there may be a tendency for the blade 102 to slide out of contact with one or both of the wheels thereby stopping the operation of the saw and possibly damaging the internal structure of the saw. Accordingly, in a preferred embodiment of the invention the drive wheel 112 and the free wheel 114 each have a friction surface 120 containing a friction material such as rubber which grips a portion of the saw blade 102 to maintain the blade 102 in position along the drive wheel 112 and the free wheel 114. It should be understood that in a preferred embodiment of the invention the drive wheel 112 and the free wheel 114 include opposing peripheral walls 122 that prevent blade 102 from coming off wheels 112 and 114 should the blade 102 drift to one or the other sides of surface 120.

Figure 12:
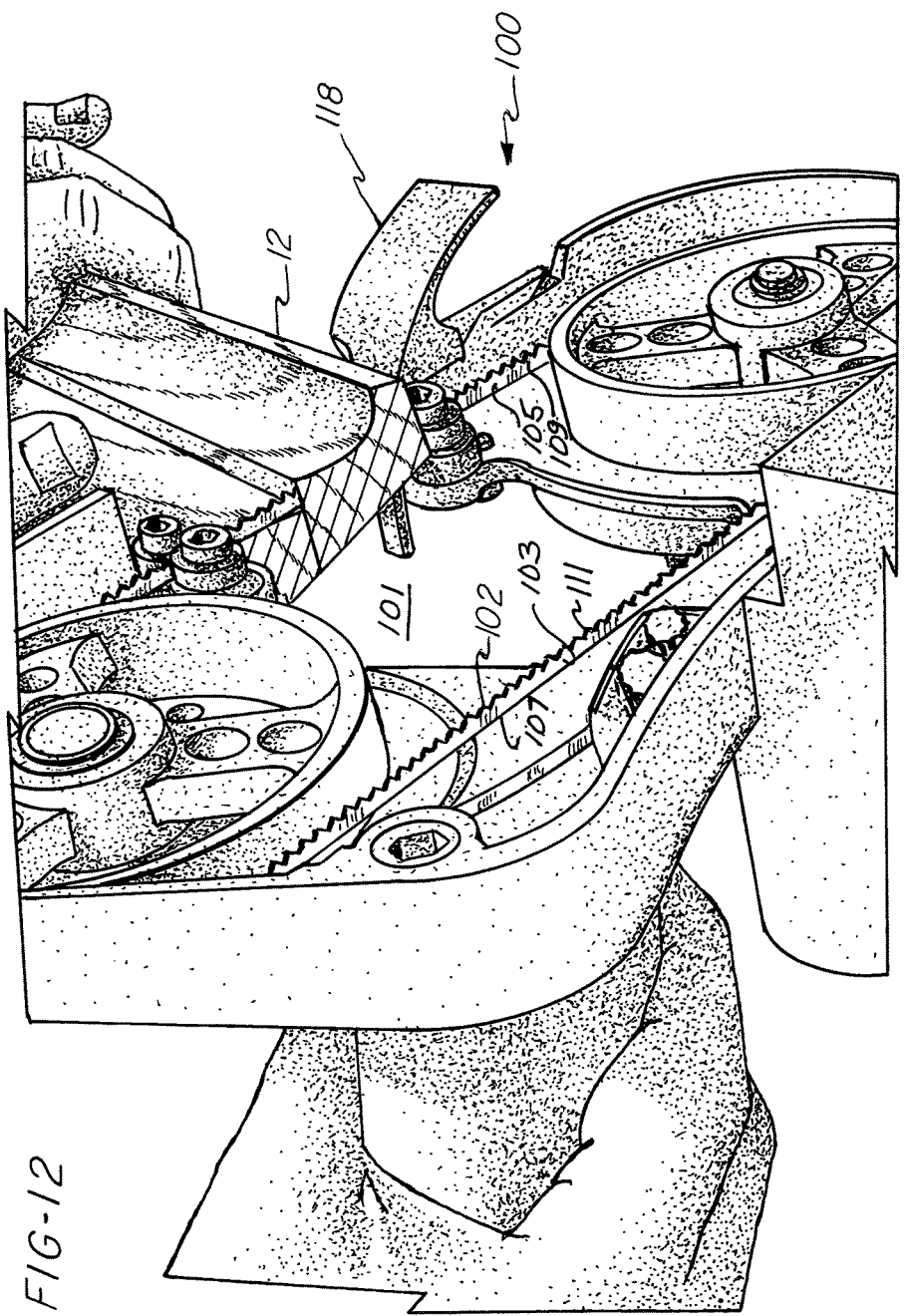
FIG. 12 is a perspective view of the coping saw showing the saw blade a having a drive wheel and a free wheel for supporting and driving the saw blade.

Referring again to FIG. 12 in a preferred embodiment of the invention the coping saw 100 further comprises a stationary guide arm 124 mounted on one side of saw 100. During the use of the saw 100, the stationary guide arm 124 is placed on a piece of molding 12 and the saw 100 is pivoted downwardly at a point on guide arm 124 toward piece 10 such that the molding piece 10 passes through the cutting plane of saw 100 and is cut by blade 102.

Figure 5:
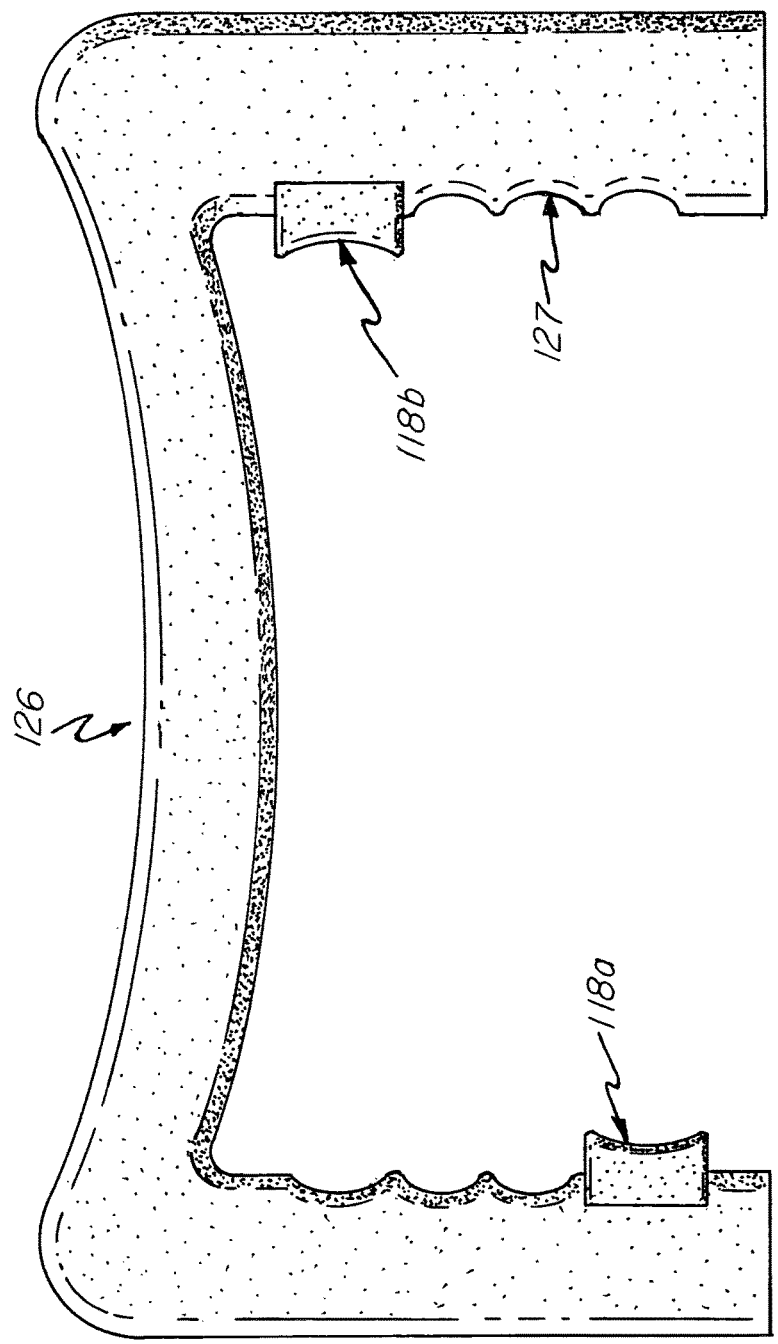
FIG. 5 is a partial side view of the coping saw of the subject invention showing a preferred embodiment of the saw handle having a first power switch and a second power switch for operating the saw in its first orientation and its second orientation, respectively.

Referring to FIGS. 4, and 5 in a preferred embodiment of the invention the coping saw 100 comprises a first and a second power switches 118a and 118b, respectively, mounted to a handle 126 having a general U shape contour.

As previously stated each power switch is electrically coupled to the motor 108 to turn the motor 108 on to drive the continuous blade 102 or to turn the motor 108 off to stop driving the blade 102. As shown in FIGS. 3, 4 and 5, the power switches 118a and 118b are placed on opposite ends of the handle 126 such that when the saw 100 is operating in its first orientation (FIG. 3), the user grips the handle such that the user's finger can apply pressure to the first power switch 118a and when the user is operating the saw 100 in its second orientation (FIG. 4), the user grips the handle 126 such that the user's finger can apply pressure to the second power switch 118b. In a preferred embodiment of the invention the handle 126 are provided with finger grips 127 to make the gripping of the handle more secure and more comfortable for the user.

Figure 6:
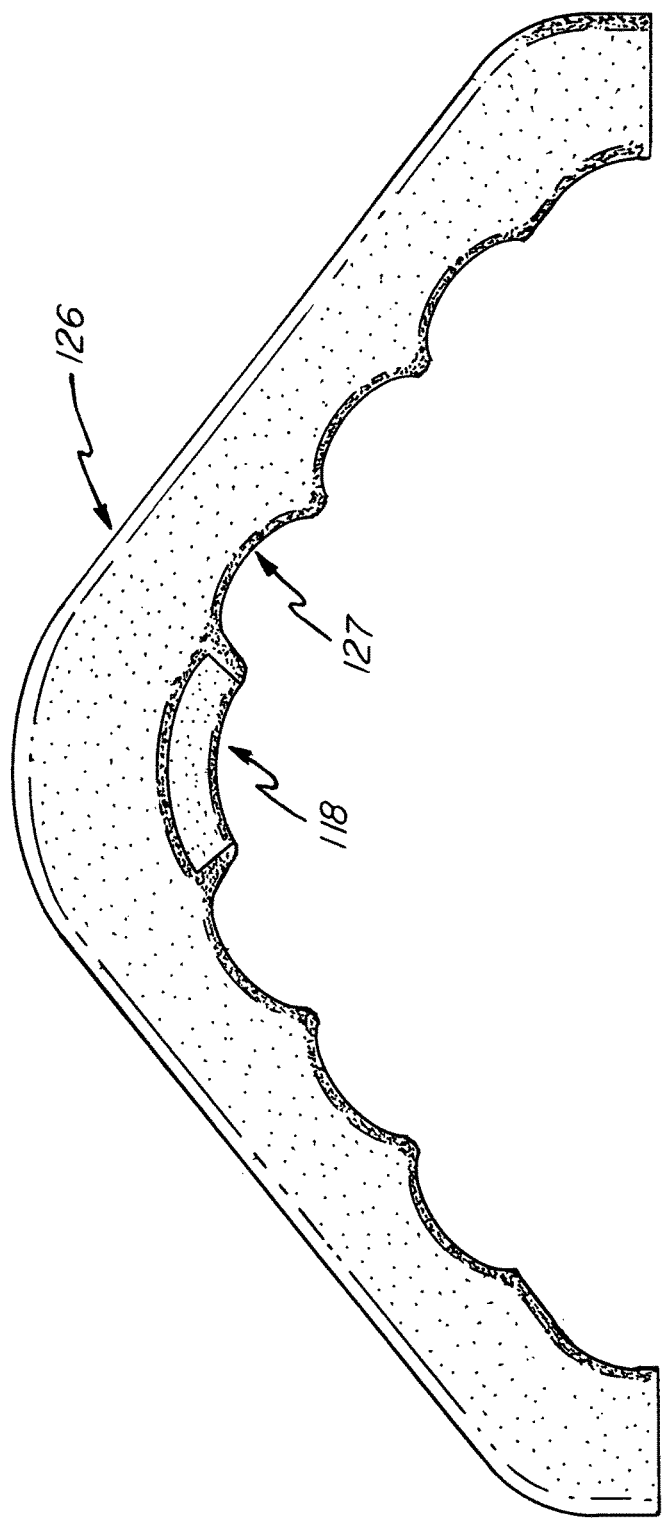
FIG. 6 is a partial side view of the coping saw of the subject invention showing another preferred embodiment of the saw handle having a centrally placed power switch for operating the saw in its first orientation and in its second orientation.

Referring to FIG. 6, another preferred embodiment of the coping saw 100 of the subject invention is shown whereby the saw handle 126 is a generally triangular shape contour handle having a centrally placed power switch 118. It should be understood that the centrally placed power switch 118 permits the user to easily operate the saw 100 in its first orientation and in its second orientation. In a preferred embodiment of the invention the handle 126 are provided with finger grips 127 to make the gripping of the handle more secure and more comfortable for the user.

Figure 7:
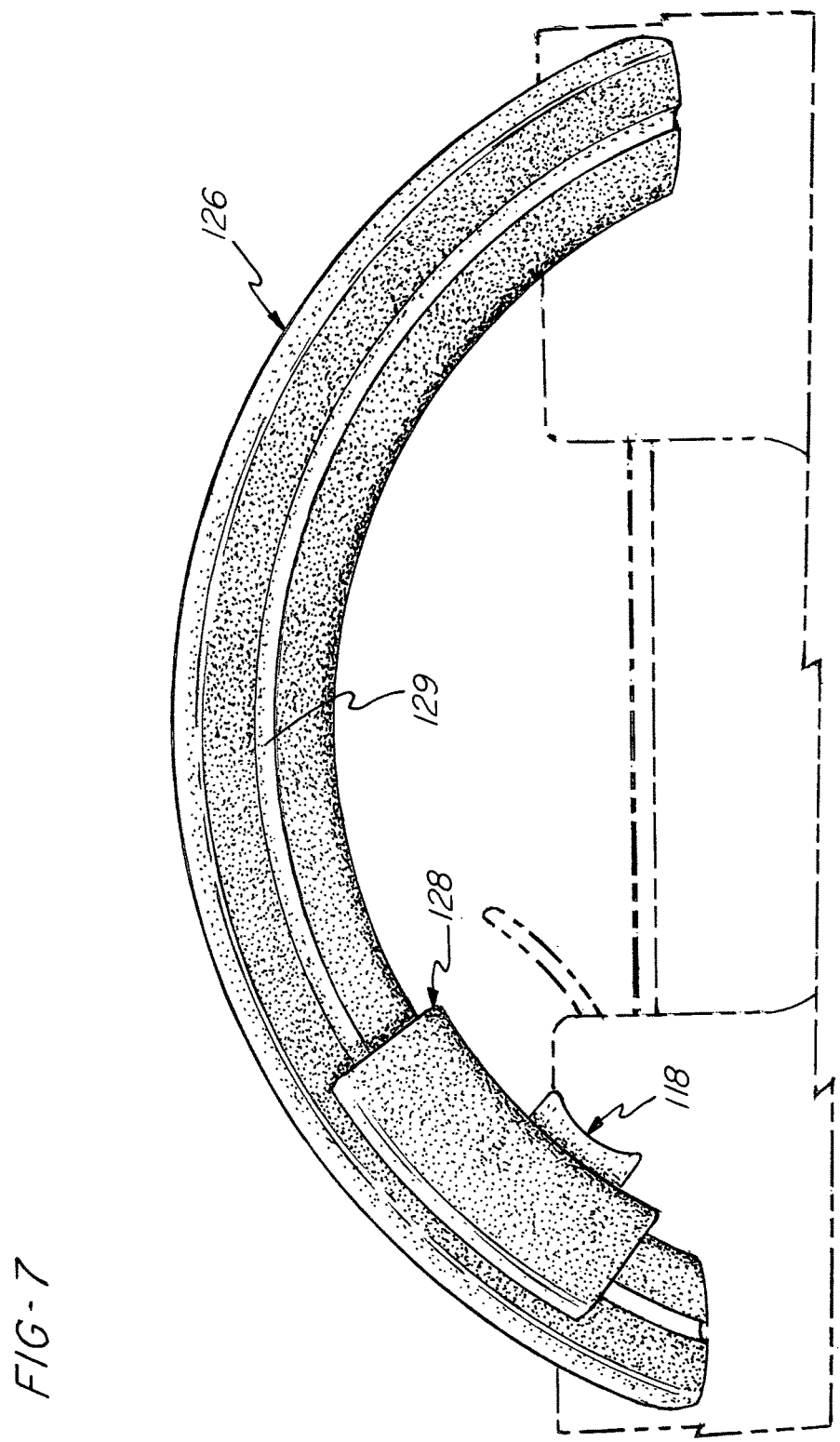
FIG. 7 is a partial side view of the coping saw of the subject invention showing another preferred embodiment of the saw handle having a switch that can slide into a first position for operating the saw in its first orientation and can slide into a second position for operating the saw in its second orientation.

Referring to FIGS. 7 and 8, another preferred embodiment of the handle 126 is shown whereby the power switch 118 is a slidable switch that is attached to a slider 128 that slides along a track 129 along the handle 126 and is electrically connected to a power source (not shown) through a wire and housing means 130 that operates to slide into a first position for operating the saw 100 in its first orientation and to slide into a second position for operating the saw 100 in its second orientation. As shown, the handle 126 includes first and second apertures 132 and 134, respectively, that cooperate with a detent 136 on the slider 128 for releasably securing the slider 128 in its desired position. As shown when the saw 100 is operating in its first orientation, the user slides the slider 128 along the handle 126 into its first position so that the user can easily apply pressure to the power switch 118 (FIG. 8 showing the slider 128 being slid along the handle 126). When the saw 100 is operating in its second orientation, the user slides the slider 128 along the handle 126 towards its second position so that the user can again easily apply pressure to the power switch 118. In a preferred embodiment of the invention the handle 126 are provided with finger grips 127 to make the gripping of the handle more secure and more comfortable for the user. It should be understood that other apparatus allowing the power switch to slide along the handle and secured in place during operation of the saw may also be utilized.

Referring to FIGS. 9-11, another preferred embodiment of the handle 126 is shown whereby the handle is pivotally attached to the saw housing 104 by a hinge 138 for allowing the handle to rotate into a first and a second position and releasably held in such positions by first and second locking means 140. As shown the locking means 140 comprise a spring hinge 142, aperture 144 and detent assembly 146 such as shown in FIG. 10, or by a spring hinge 142 and detent assembly 146 that clasps a portion of the handle 126 such as shown in FIG. 11. It should be understood that the locking means described is not limited to the locking means described but can be any locking means capable for releasably securing the handle in its first and second positions. When the saw 100 is operating in its first orientation, the user rotates the handle 126 into its first position and secures it in place by the locking means 140 so that the user can easily apply pressure to the power switch 118 mounted to the handle 126. When the saw 100 is operating in its second orientation, the user releases the locking means 140 and pivots the handle 126 to its second position and secures it in place by the second locking means 140 so that the user can easily apply pressure to the power switch 118. In a preferred embodiment of the invention the handle 126 are provided with finger grips 127 to make the gripping of the handle more secure and more comfortable for the user.

It should now be apparent to one skilled in the art that the present invention is a new and improved coping saw for performing a coping operation. As shown and described the saw is operable in a first orientation and in a second orientation and comprises a handle having one or more power switches for activating and deactivating the drive system in both the first orientation and in the second orientation. It should also now be apparent to one skilled in the art that the coping saw of the subject application provides a saw that is easily used by both right hand uses and left had users.

Although the foregoing invention has been described in some detail for purposes of clarity of understanding, it should be apparent that certain changes and modifications may be practiced within the scope of the appended claims. Furthermore, it should be noted that there are alternative ways of implementing the method and article for implementing the method of the present invention. Accordingly, the present embodiments and examples are to be considered as illustrative and not restrictive, and the invention is not to be limited to the details given herein, but may be modified within the scope and equivalents of the appended claims.

I claim:

1. A coping saw for operating in a first orientation and in a second orientation by a user using one hand to perform coping operations on molding comprising:
   a housing;
   a drive system mounted to said housing for driving a continuous blade; and
   a handle effective for allowing a user to use the hand to grip and operate the coping saw in a first orientation such that the hand of the user is positioned directly above said housing for performing a first coping operation and for allowing the user to operate the coping saw in a second orientation such that the hand of the user is positioned directly below said housing for performing a second coping operation, wherein said handle having a first power switch for activating and deactivating said drive system when the saw is in the first orientation and a second power switch for activating and deactivating said drive system when the saw is in the second orientation;
   wherein said first power switch and said second power switch are positioned on said handle such that said switches are along separate longitudinal parallel axis.

2. The coping saw of claim 1 wherein said first power switch and said second power switch are placed on opposite ends of said handle.

3. The coping saw of claim 1 wherein said first power switch and said second power switch further operate as variable speed controls for controlling the speed of said blade.

4. The coping saw of claim 1 wherein said drive system comprises a drive wheel driven by an electric motor and coupled to a free wheel by said continuous blade.

5. The coping saw of claim 1 further comprising a guide that operates to provide a support surface for the molding during operation of the coping saw.

6. A coping saw for operating in a first orientation and in a second orientation by a user using one hand to perform coping operations on molding comprising:

a housing having a cavity;

a drive system mounted to said housing for driving a continuous blade having an extending rectangular shape with a front planar surface, a back planar surface, a continuous first edge, a continuous second edge, and a plurality of cutting teeth positioned along only said continuous second edge and extending away from said cavity; and a handle mounted to said housing and effective for allowing a user to use a hand to grip and operate the coping saw in a first orientation such that the hand of the user is positioned directly above said housing for performing a first coping operation and for allowing the user to grip and operate the coping saw in a second orientation such that the hand of the user is positioned directly below said housing for performing a second coping operation, wherein said handle having a power switch attached to a slider for sliding said power switch from a first position into a second position that operates to activate and deactivate said drive system when the saw is in the first orientation and to slide along said handle and to activate and deactivate said drive system when the saw is in the second orientation.

\* \* \* \* \*